(12) United States Patent
Han

(10) Patent No.: US 11,402,945 B2
(45) Date of Patent: Aug. 2, 2022

(54) TOUCH SENSING METHOD AND TOUCH SENSING DEVICE BASED ON DRIVING AND SENSING SIGNALS

(71) Applicant: Seung-Hee Han, Gyeonggi-do (KR)

(72) Inventor: Seung-Hee Han, Gyeonggi-do (KR)

( * ) Notice: Subject to any disclaimer, the term of this patent is extended or adjusted under 35 U.S.C. 154(b) by 223 days.

(21) Appl. No.: 16/692,384

(22) Filed: Nov. 22, 2019

(65) Prior Publication Data

US 2020/0089385 A1 Mar. 19, 2020

Related U.S. Application Data

(63) Continuation-in-part of application No. 15/534,139, filed as application No. PCT/KR2015/013031 on Dec. 2, 2015, now abandoned.

(30) Foreign Application Priority Data

Dec. 9, 2014 (KR) ........................ 10-2014-0175521

(51) Int. Cl.
*G06F 3/041* (2006.01)
*G06F 3/044* (2006.01)

(52) U.S. Cl.
CPC ...... *G06F 3/04182* (2019.05); *G06F 3/04186* (2019.05); *G06F 3/0445* (2019.05); *G06F 3/0446* (2019.05)

(58) Field of Classification Search
CPC .... G06F 3/041; G06F 3/0416; G06F 3/04164; G06F 3/04166; G06F 3/04168; G06F 3/0418;
(Continued)

(56) References Cited

U.S. PATENT DOCUMENTS 9,012,793 B2 4/2015 Reynolds
2011/0084857 A1 4/2011 Marino et al.
(Continued)

FOREIGN PATENT DOCUMENTS

JP 2012063950 A 3/2012
JP 2013229032 A 11/2013
(Continued)

OTHER PUBLICATIONS

International Search Report, International Application No. PCT/KR2015/013031 dated Mar. 9, 2016.

*Primary Examiner* — Keith L Crawley
(74) *Attorney, Agent, or Firm* — Hauptman Ham, LLP

(57) ABSTRACT

A touch sensing device includes a touch panel and a touch sensing controller. The touch panel includes driving electrodes and sensing electrodes. The touch sensing controller provides driving electrodes with driving signals having different frequencies from each other, respectively, and performs a fast Fourier transform (FFT) processing on the sensing signals sensed at each of the sensing electrodes to determine whether or not a touch is generated based on a variation amount between frequency magnitude of the sensing signal and frequency magnitude of the driving signal. The touch sensing controller performs a convolution operation of mixing the driving signal or the sensing signal and a mixing signal having a predetermined frequency, and separates the mixing signal from the sensing signal on which the convolution operation is performed to determine whether or not a touch is generated by reconstructing an original driving signal.

17 Claims, 12 Drawing Sheets

(58) Field of Classification Search
CPC ............ G06F 3/04182; G06F 3/04184; G06F 3/04186; G06F 3/044; G06F 3/0445; G06F 3/0446; G06F 17/14; G06F 17/141; G06F 17/142; G06F 17/15; G06F 17/153; G06F 17/156; G06F 2203/04104
See application file for complete search history.

(56) References Cited

U.S. PATENT DOCUMENTS

| | | |
|---|---|---|
| 2013/0050132 A1 | 2/2013 | Calpe Maravilla et al. |
| 2014/0152612 A1 | 6/2014 | Choi et al. |
| 2014/0327644 A1 | 11/2014 | Mohindra |
| 2015/0022489 A1 | 1/2015 | Gossner |
| 2015/0301651 A1* | 10/2015 | Leigh ................. G06F 3/042 345/174 |
| 2016/0117051 A1 | 4/2016 | Han et al. |
| 2016/0148034 A1* | 5/2016 | Kremin ............ G06K 9/00033 382/124 |
| 2016/0231854 A1 | 8/2016 | Koo |
| 2017/0024056 A1* | 1/2017 | Wilkinson ............ G06F 3/0445 |
| 2017/0090671 A1* | 3/2017 | Khazeni ............ G06F 3/04184 |
| 2017/0343386 A1* | 11/2017 | Tanaka ................ G01R 27/2605 |
| 2018/0253185 A1* | 9/2018 | Imanilov ............ G06F 3/04182 |
| 2018/0260045 A1* | 9/2018 | Lee .................... G06F 3/03547 |

FOREIGN PATENT DOCUMENTS

| | | | |
|---|---|---|---|
| KR | 1020120095376 A | 8/2012 | |
| KR | 1020120133945 A | 12/2012 | |
| KR | 1020140071049 A | 6/2014 | |
| KR | 102081809 B1 * | 2/2020 | ........... G06F 3/0418 |

* cited by examiner

TOUCH SENSING METHOD AND TOUCH SENSING DEVICE BASED ON DRIVING AND SENSING SIGNALS

RELATED APPLICATIONS

The present application is a Continuation-in-Part of U.S. application Ser. No. 15/534,139 filed Jun. 8, 2017, which is a U.S. National Phase of International Application No. PCT/KR2015/013031 filed Dec. 2, 2015 and claims priority to Korean Application No. 10-2014-0175521 filed Dec. 9, 2014, the disclosures of which are hereby incorporated by reference herein in their entirety.

BACKGROUND OF THE INVENTION

Technical Field

Exemplary embodiments of the present invention relate to a touch sensing method and a touch sensing device for performing the method. More particularly, exemplary embodiments of the present invention relate to a touch sensing method which determines whether or not a touch is generated based on a driving frequency amplitude of a driving signal and a sensing frequency amplitude corresponding to a sensing signal and a touch sensing device for performing the method.

Discussion of the Related Art

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch sensitive device including, for example, resistive, infrared, capacitive, surface acoustic wave, electromagnetic, near field imaging, etc. Capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, a capacitance is formed therebetween. In the case of a capacitive touch sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of the object as it is moved across the touch surface.

There are two known techniques used to capacitively measure touch.

One technique is to measure capacitance-to-ground, whereby a signal is applied to an electrode. A touch in proximity to the electrode causes signal current to flow from the electrode, through an object such as a finger, to electrical ground.

The other technique used to capacitively measure touch is through mutual capacitance. Mutual capacitance touch screens apply a signal to a driven electrode, which is capacitively coupled to a receiver electrode by an electric field. Signal coupling between the two electrodes is reduced by an object in proximity, which reduces the capacitive coupling.

SUMMARY

Exemplary embodiments of the present invention provide a touch sensing method which determines whether or not a touch is generated based on an amplitude of a driving frequency corresponding to a driving signal and an amplitude of a sensing frequency corresponding to a sensing signal.

Exemplary embodiments of the present invention also provide a touch sensing device for performing the above-mentioned method.

In order to realize the object of the present invention, according to a touch sensing method according to an embodiment, a driving signal obtained by performing a convolution operation of mixing each of the plurality of driving signals having different frequencies and a mixing signal having a predetermined frequency is provided to each of a plurality of driving electrodes. Then, a sensing signal sensed through a plurality of sensing electrodes is amplified. Then, the amplified sensing signal is band pass filtered. Then, an analog-to-digital conversion of the band pass filtered sensing signal is performed. Then, through first half processing of the FFT on the analog-digital converted sensing signal, a real component and an imaginary component for each frequency of the sensed signal are obtained. Then, a deconvolution operation is performed on the real component and the imaginary component to reconstruct the frequency of the original driving signal. Then, a frequency magnitude of each driving signal is obtained through second half processing of the FFT for the real component and the imaginary component of the recovered frequency. Then, it is determined whether or not a touch is generated based on a variation amount between the obtained frequency magnitude and the frequency magnitude of the driving signal.

In an exemplary embodiment, the mixing signal may include a sinusoidal wave, and a frequency of the sinusoidal wave may be about 0.5 times the minimum frequency interval of the driving signals to an integer multiple of the minimum frequency interval.

In an exemplary embodiment, the frequency of the driving signal may be determined to avoid a frequency band of a noise component.

In an exemplary embodiment, when a noise component is introduced during a touch sensing operation, a frequency of the driving signal may be set except for the frequency band of the noise component.

In an exemplary embodiment, the amplified signal may be analog-digital converted to a frequency two times faster than a frequency of the driving signal.

According to another aspect of the present invention, according to a touch sensing method, a plurality of driving signals having different frequencies are provided to each of a plurality of driving electrodes. Then, a sensing signal sensed through a plurality of sensing electrodes is first amplified. Then, a convolution operation is performed in which each of the first amplified sensing signals is mixed with a mixing signal having a predetermined frequency. Then, the sensing signal on which the convolution operation is performed is second amplified. Then, band pass filtering of the second amplified sensing signal is performed. Then, the band pass filtered sensing signal is analog-to-digital converted. Then, a real component and an imaginary component for each frequency of the sensed signal are obtained through a first half processing of the FFT on the analog-digital converted sensing signal. Then, a deconvolution operation is performed on the real component and the imaginary component to reconstruct the frequency of the original driving signal. Then, a frequency magnitude of each driving signal is obtained through a second half processing of the FFT on the real component and the imaginary component of the recovered frequency. Then, it is determined whether or not a touch is generated based on a variation amount between the obtained frequency magnitude and the frequency magnitude of the driving signal.

In an exemplary embodiment, the mixing signal may include a sinusoidal wave, and a frequency of the sinusoidal wave may be about 0.5 times the minimum frequency interval of the driving signals to an integer multiple of the minimum frequency interval.

In an exemplary embodiment, the frequency of the driving signal may be determined to avoid a frequency band of a noise component.

In an exemplary embodiment, when a noise component is introduced during a touch sensing operation, a frequency of the driving signal may be set except for the frequency band of the noise component.

According to another aspect of the present invention, a touch sensing device includes a touch panel and a touch sensing controller. The touch panel includes a plurality of driving electrodes and a plurality of sensing electrodes. The touch sensing controller provides a plurality of driving electrodes with a plurality of driving signals having different frequencies from each other, respectively, and performs a fast Fourier transform (FFT) processing on the sensing signals sensed at each of the sensing electrodes to determine whether or not a touch is generated based on a variation amount between frequency magnitude of the sensing signal and frequency magnitude of the driving signal. The touch sensing controller performs a convolution operation of mixing the driving signal or the sensing signal and a mixing signal having a predetermined frequency, and separates the mixing signal from the sensing signal on which the convolution operation is performed to determine whether or not a touch is generated by reconstructing an original driving signal.

In an exemplary embodiment, the touch sensing controller may include a driving unit and a sensing unit. The driving unit is configured to output a driving signal obtained by performing a convolution operation for mixing the mixing signal to the driving signal to the driving electrode. The sensing unit is configured to separate the mixing signal from the convoluted sensing signal received through the sensing electrode and determines whether a touch occurs by reconstructing the original driving signal.

In an exemplary embodiment, the sensing unit may include a signal amplifying part, a band pass filtering part, an analog-digital converting part, a Fast Fourier Transform (FFT) first half block, a deconvolution block, a FFT second half block and a touch determining unit. The signal amplifying part is configured to amplify a sensing signal sensed through a plurality of sensing electrodes. The band pass filtering part is configured to band pass filter the amplified sensing signal. The analog-digital converting part is configured to digitally convert the band pass filtered sensing signal. The FFT first half block is configured to obtain a real component and an imaginary component for each frequency of the sensed signal through first half processing of FFT for the digitally converted sensing signal. The deconvolution block is configured to perform a deconvolution operation on the real component and the imaginary component to reconstruct a frequency of an original driving signal. The FFT second half block is configured to obtain a frequency magnitude of each driving signal through the latter processing of the FFT for the real component and the imaginary component of the recovered frequency. The touch determining unit is configured to determine whether or not a touch is generated based on a variation amount between the obtained frequency magnitude and the frequency magnitude of the driving signal.

In an exemplary embodiment, the touch sensing controller may further include a control unit providing the analog-to-digital converting part with information about the frequency of the driving signal so that the analog-to-digital converting part converts the driving signal at a frequency faster than the frequency of the driving signal.

In an exemplary embodiment, the touch sensing controller further comprises a noise sensing unit sensing a surrounding noise component and providing the control unit with a frequency characteristic of the sensed noise component.

In an exemplary embodiment, the control unit may control the driving unit so that the frequency band of the noise component provided by the noise sensing unit is avoided to generate the driving signal.

In an exemplary embodiment, the touch sensing controller may include a driving unit and a sensing unit. The driving unit is configured to provide a driving signal to the driving electrode. The sensing unit is configured to convolute a mixing signal having a predetermined frequency to the driving signal or the sensing signal, and separate the mixing signal from the convoluted sensing signal to determine whether or not a touch is generated by reconstructing an original driving signal.

In an exemplary embodiment, the sensing unit may include a signal amplifying part, a band pass filtering part, an analog-digital converting part, a FFT (Fast Fourier Transform) first half block, a deconvolution block, a FFT second half block and a touch determining unit. The signal amplifying part is configured to first amplify a sensing signal sensed through plural sensing electrodes, convoluting a mixing signal having a predetermined frequency to each of the first amplified sensing signal, and second amplify the convoluted sensing signal. The band pass filtering part is configured to band pass filter the second amplified sensing signal. The analog-digital converting part is configured to digitally convert the band pass filtered sensing signal. The FFT first half block is configured to obtain a real component and an imaginary component for each frequency of the sensed signal through first half processing of FFT for the digitally converted sensing signal. The deconvolution block is configured to perform a deconvolution operation on the real component and the imaginary component to reconstruct a frequency of an original driving signal. The FFT second half block is configured to obtain a frequency magnitude of each driving signal through the latter processing of the FFT for the real component and the imaginary component of the recovered frequency. The touch determining unit is configured to determine whether or not a touch is generated based on a variation amount between the obtained frequency magnitude and the frequency magnitude of the driving signal.

In an exemplary embodiment, the touch sensing controller may further include a control unit providing the analog-to-digital converting part with information about the frequency of the driving signal so that the analog-to-digital converting part converts the driving signal at a frequency faster than the frequency of the driving signal.

In an exemplary embodiment, the touch sensing controller may further include a noise sensing unit sensing a surrounding noise component and providing the control unit with a frequency characteristic of the sensed noise component.

In an exemplary embodiment, the control unit may control the driving unit so that the frequency band of the noise component provided by the noise sensing unit is avoided to generate the driving signal.

According to some exemplary embodiments of the touch sensing method and the touch sensing device having the touch sensing controller, it is possible to determine whether or not a touch is generated based on a variation amount of a sensing frequency magnitude corresponding to the sensing signal on the basis of the driving frequency magnitude corresponding to the driving signal. Moreover, since a touch is sensed through a variation amount of a transmission frequency magnitude already known in a sensed signal, it is easy to distinguish a noise component having a frequency component from a touch component. Therefore, it is possible to measure only the variation amount of the sensing signal of the desired frequency by using the result of the FFT without a separate process for the noise component generated in the operating environment of the touch screen, so that an adverse influence due to the noise may be solved more easily.

BRIEF DESCRIPTION OF THE DRAWINGS

The above and other features and aspects of the present invention will become more apparent by describing in detailed exemplary embodiments thereof with reference to the accompanying drawings, in which.

DETAILED DESCRIPTION OF THE INVENTION

Figure 1:
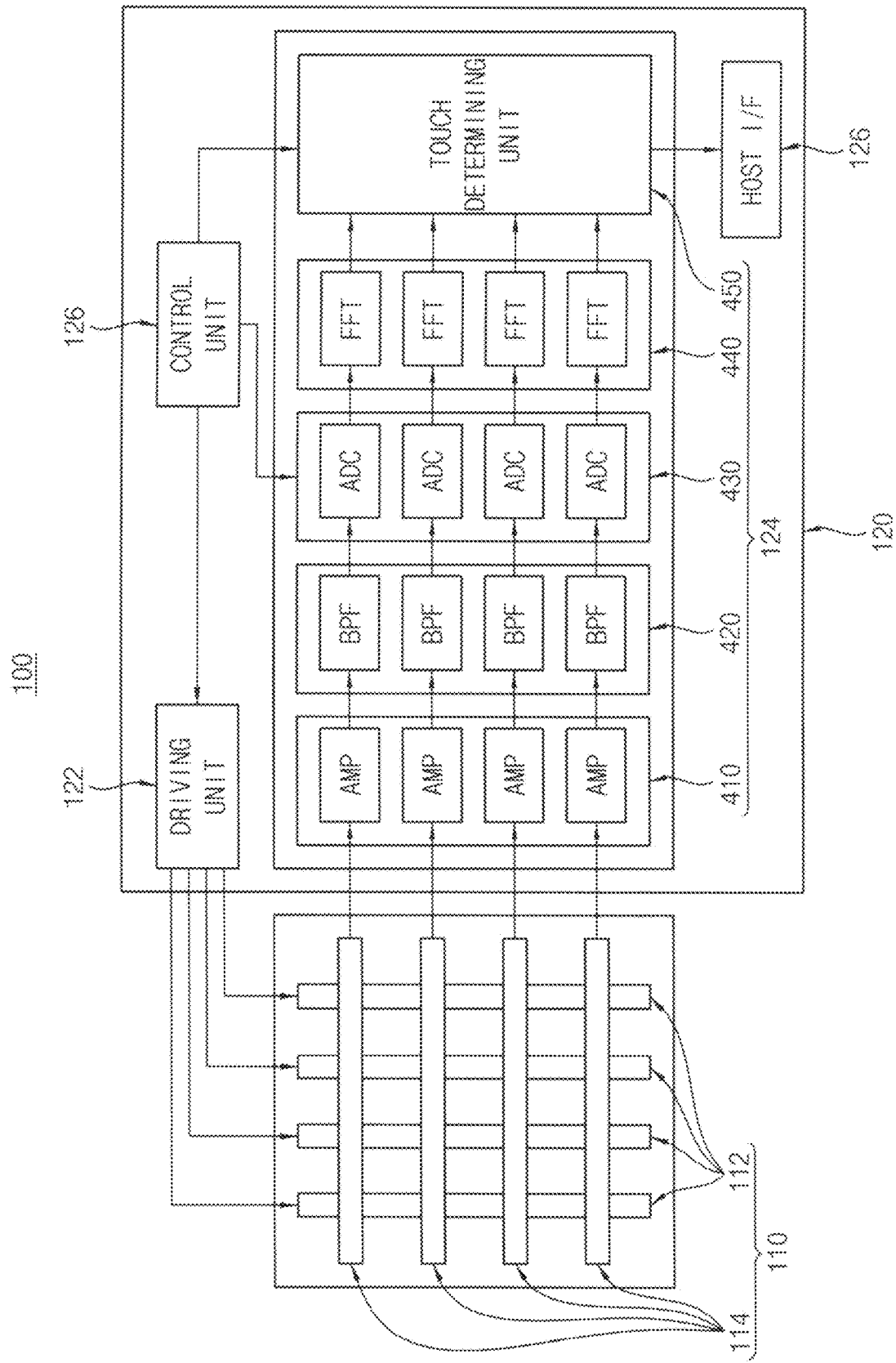
FIG. 1 is a block diagram illustrating a touch sensing device according to an exemplary embodiment of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
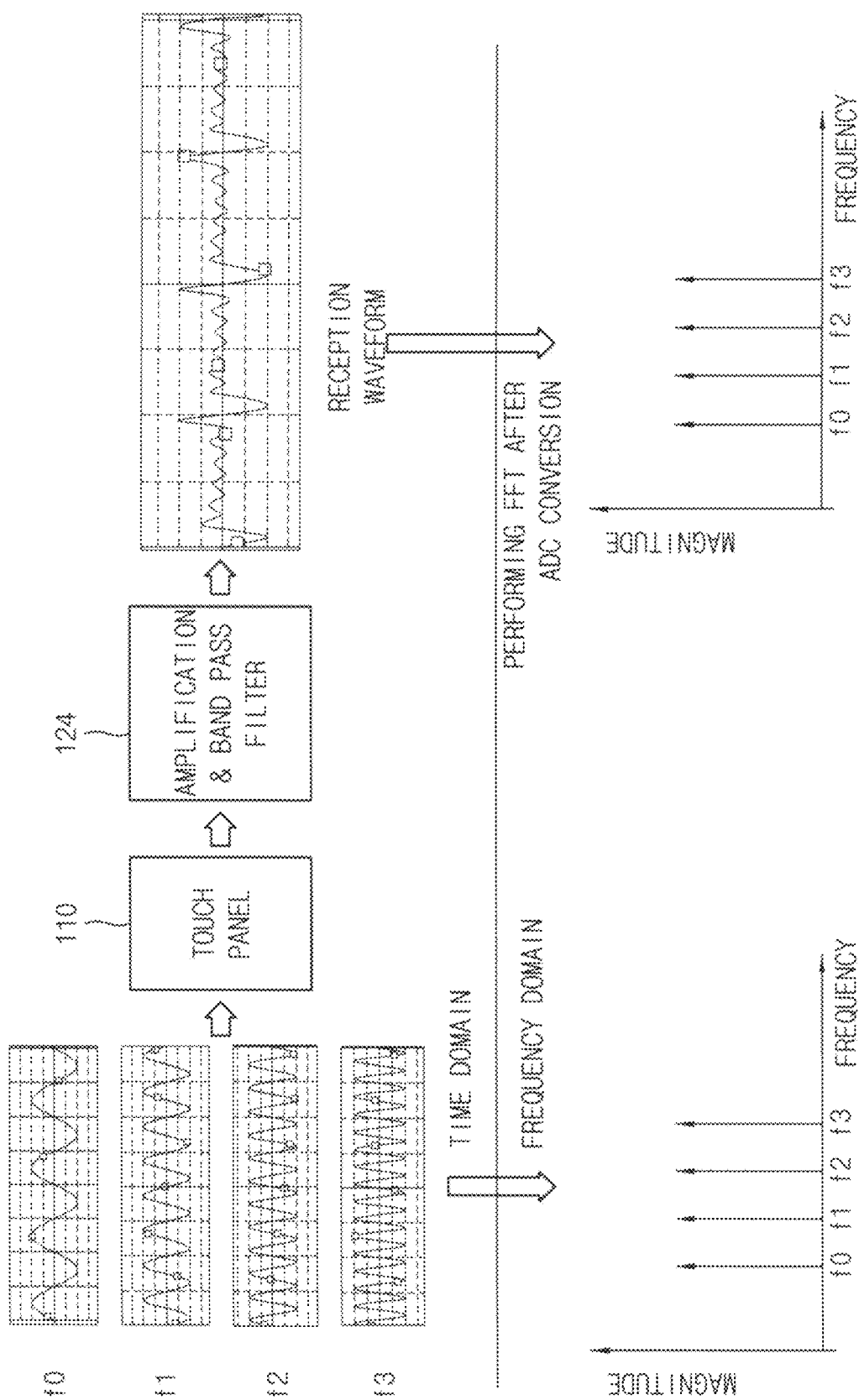
FIG. 2 is a schematic diagram illustrating a touch sensing method through a driving signal and a sensing signal of the touch sensing device shown in FIG. 1.

FIG. 1 is a block diagram illustrating a touch sensing device 100 according to an exemplary embodiment of the present invention. FIG. 2 is a schematic diagram illustrating a touch sensing method through a driving signal and a sensing signal of the touch sensing device 100 shown in FIG. 1.

Referring to FIG. 1 and FIG. 2, a touch sensing device 100 according to an exemplary embodiment of the present invention includes a touch panel 110 and a touch sensing controller 120.

The touch panel 110 includes a plurality of driving electrodes 112 and a plurality of sensing electrodes 114. The driving electrodes 112 and the sensing electrodes 114 may be disposed on different layers. In FIG. 1, the driving electrodes 112 are disposed on a lower layer and the sensing electrodes 114 are disposed on an upper layer, and vice versa. The driving electrodes 112 and the sensing electrodes 114 may be arranged in a matrix type when viewed on a plane. Although the touch panel 110 is shown in FIG. 1 as having a 4×4 matrix of driving electrodes 112 and sensing electrodes 114, other numbers of electrodes and other matrix sizes may be used.

The touch panel 110 is substantially transparent so that a user can view an object (e.g., a pixelated display of a computer, handheld device, mobile phone, or other surrounding device) through the touch panel 110.

For convenience of explanation, the driving electrodes 112 and the sensing electrodes 114 are shown to be wide and obtrusive, but in practice they may be relatively narrow and inconspicuous to a user. Each of the driving electrodes 112 and the sensing electrodes 114 may be designed to have variable widths, e.g., an increased width in the form of a diamond- or other-shaped pad in the vicinity of the nodes of the matrix in order to increase the inter-electrode fringe field and thereby increase the effect of a touch on electrode-to-electrode capacitive coupling.

In an exemplary embodiment, the driving electrodes 112 and the sensing electrodes 114 may be composed of indium tin oxide (ITO) or other suitable electrically conductive material.

The touch sensing controller 120 includes a driving unit 122, a sensing unit 124 and a control unit 126. The touch sensing controller 120 provides the driving electrodes 112 with plural driving signals having different driving frequencies. The touch sensing controller 120 performs Fast Fourier transform (FFT) on sensing signals sensed by each of the sensing electrodes 114 to determine whether or not a touch is generated based on a variation amount of the sensing frequency magnitude with respect to the driving frequency.

The driving unit 122 simultaneously supplies driving signals having different driving frequencies to each of the driving electrodes 112. For example, as shown in FIG. 2, the driving unit 122 supplies a driving signal having a first frequency f0 to a first driving electrode, supplies a driving signal having a second frequency f1 to a second driving electrode, supplies a driving signal having a third frequency f2 to a third driving electrode, and supplies a driving signal having a fourth frequency f3 to a fourth driving electrode. The driving signals having different driving frequencies may be generated under the control of the control unit 126. In the present exemplary embodiment, the driving signals may include sinusoidal waves such as a sine wave or a cosine wave and the like. In the present exemplary embodiment, the driving unit 122 drives the driving electrodes 112 at the same time using driving signals having different driving frequencies, so that the touch sensing time is fast and thus a high-speed response is possible.

The sensing unit 124 receives sensing signals from each of the sensing electrodes 114 to obtain frequency magnitude of the sensing signal through a Fast Fourier transform, and calculates a variation amount between the frequency magnitude of the sensing signal and the frequency magnitude of the driving signal to determine whether or not a touch is generated.

The sensing unit 124 includes a signal amplifying unit 410, a bandpass filter unit 420, an analog-to-digital converting unit 430, a Fast Fourier transform unit 440 and a touch determining unit 450.

The signal amplifying unit 410 includes a plurality of signal amplifiers to be connected to each of the sensing electrodes 114, and amplifies a sensing signal output from each of the sensing electrodes 114 to supply the amplified sensing signal to the bandpass filter unit 420.

The bandpass filter unit 420 includes a plurality of bandpass filters. The bandpass filter unit 420 band-pass filters each of the amplified sensing signals to provide the band-pass filtered signals to the analog-to-digital converting unit 430.

The analog-to-digital converting unit 430 includes a plurality of analog-to-digital converters, digitally converts each of the band-pass filtered sensing signals, and provides the converted signals to the Fast Fourier transformer 440. The analog-to-digital converting unit 430 performs the ADC conversion at a frequency at least two times faster than the driving frequency. Information about the driving frequency may be provided from the control unit 126.

The Fast Fourier transform unit 440 includes a plurality of Fast Fourier transformers, and performs Fast Fourier transform each of the digitally converted sensing signals to convert each of the sensing signals into a frequency domain in a time domain. The Fast Fourier transform unit 440 obtains a frequency component and the magnitude of the frequency component to provide the frequency component and the magnitude of the frequency component to the touch determining unit 450. In the present exemplary embodiment, by converting the sensing in the time domain into the sensing in the frequency domain, it is very useful for digital signal processing.

The touch determining unit 450 determines whether or not a touch is generated based on a variation amount between frequency magnitudes of the Fast Fourier transformed sensing signals based on the frequency magnitude of the driving signal. Information about the frequency of the driving signal may be provided from the control unit 126.

In the present embodiment, the sensing unit 124 includes the bandpass filter unit 420, but the bandpass filter unit 420 may be omitted. The bandpass filter unit 420 may be replaced with a low pass filter unit or a high pass filter unit.

The touch sensing controller 120 may further include a host interface 126. The host interface 126 provides a touch position determined by the touch determining unit 450 to an external host (not shown).

The touch sensing controller 120 may further include one or more memory devices (not shown) for storing measured sizes and associated parameters, and a microprocessor (not shown) for performing the necessary computation and control functions.

In order to perform one or more of the functions described herein, other portions of the touch sensing controller 120 and/or the touch sensing device 100 may be realized as one or more application-specific integrated circuits (ASICs), application-specific standard product (ASSP) or the like.

Figure 3:
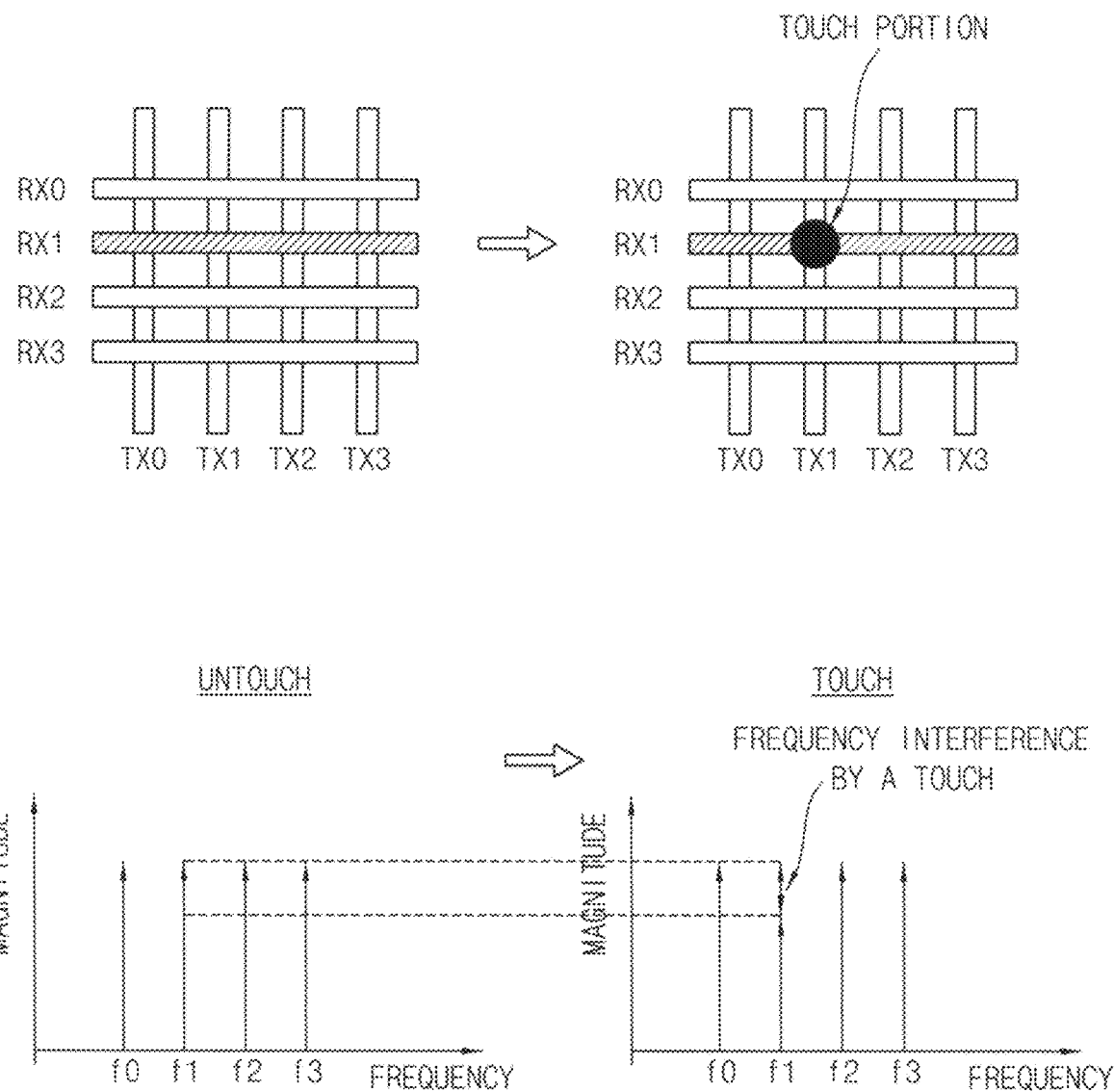
FIG. 3 is a diagram illustrating a sensing frequency detected according to whether or not a touch is generated in a specific sensing electrode.

FIG. 3 is a diagram illustrating a sensing frequency detected according to whether or not a touch is generated in a specific sensing electrode. In particular, it is described that the sensing frequency detected at the specific sensing electrode as a touch is not generated and the sensing frequency detected at the specific sensing electrode as the touch is generated, respectively.

Referring to FIG. 3, first to fourth driving electrodes TX0, TX1, TX2 and TX3 and first to fourth sensing electrodes RX0, RX1, RX2 and RX3 are arranged on a touch panel in a matrix type.

For touch sensing, a transmission signal having a first driving frequency f0, a transmission signal having a second driving frequency f1, a transmission signal having a third driving frequency f2, and a transmission signal having a fourth driving frequency f3 are applied to each of the first to fourth driving electrodes TX0, TX1, TX2 and TX3.

When a touch is not generated, the magnitudes of the first to fourth frequencies f0, f1, f2 and f3 detected in the sensing signal are equal to each other.

However, when a touch is generated, the magnitudes of the frequencies detected in the sensing signal are different to each other. As shown in FIG. 3, when a touch is generated in a portion where a second driving electrode TX1 intersects with a second sensing electrode RX1, in a sensing signal received through the second sensing electrode RX1, a magnitude of a second frequency component (f1) is attenuated relative to other frequency components.

Accordingly, the touch determining unit 450 of FIG. 1 determines that a touch is generated in a portion where the second driving electrode TX1 and the second sensing electrode RX1 intersect.

As described above, according to the present embodiment, since a touch is sensed through a variation amount of a transmission frequency magnitude already known in a sensed signal, it is easy to distinguish a noise component having a frequency component from a touch component. Therefore, it is possible to measure only the variation amount of the sensing signal of the desired frequency by using the result of the FFT without a separate process for the noise component generated in the operating environment of the touch screen, so that an adverse influence due to the noise may be solved more easily.

Moreover, since a plurality of driving electrodes is simultaneously driven, the touch sensing time can be increased and a high-speed response is possible.

Moreover, since a sensing in the time domain is converted into a sensing in the frequency domain, digital signal processing is possible.

Generally, in order to have a strong characteristic against a noise frequency, a pulse-like voltage was driven at a driving frequency of about 400 kHz. When the size of the touch screen is increased or the resistance component and the capacitance component are increased in the cross-sectional sensor, the touch sensing device having a large RC time constant can not drive a transmission frequency of 400 kHz or more. When the touch sensing device is driven at such a low frequency, there is a difficulty in a touch sensing due to noise interference of the mobile phone.

However, according to the present exemplary embodiment, since the driving frequency can be driven slower than the time constant of the sensor, that is, the time constant of the driving electrode, it is advantageous to drive the high resistance sensor (i.e., a middle or large sized sensor or a sectional sensor).

Figure 4:
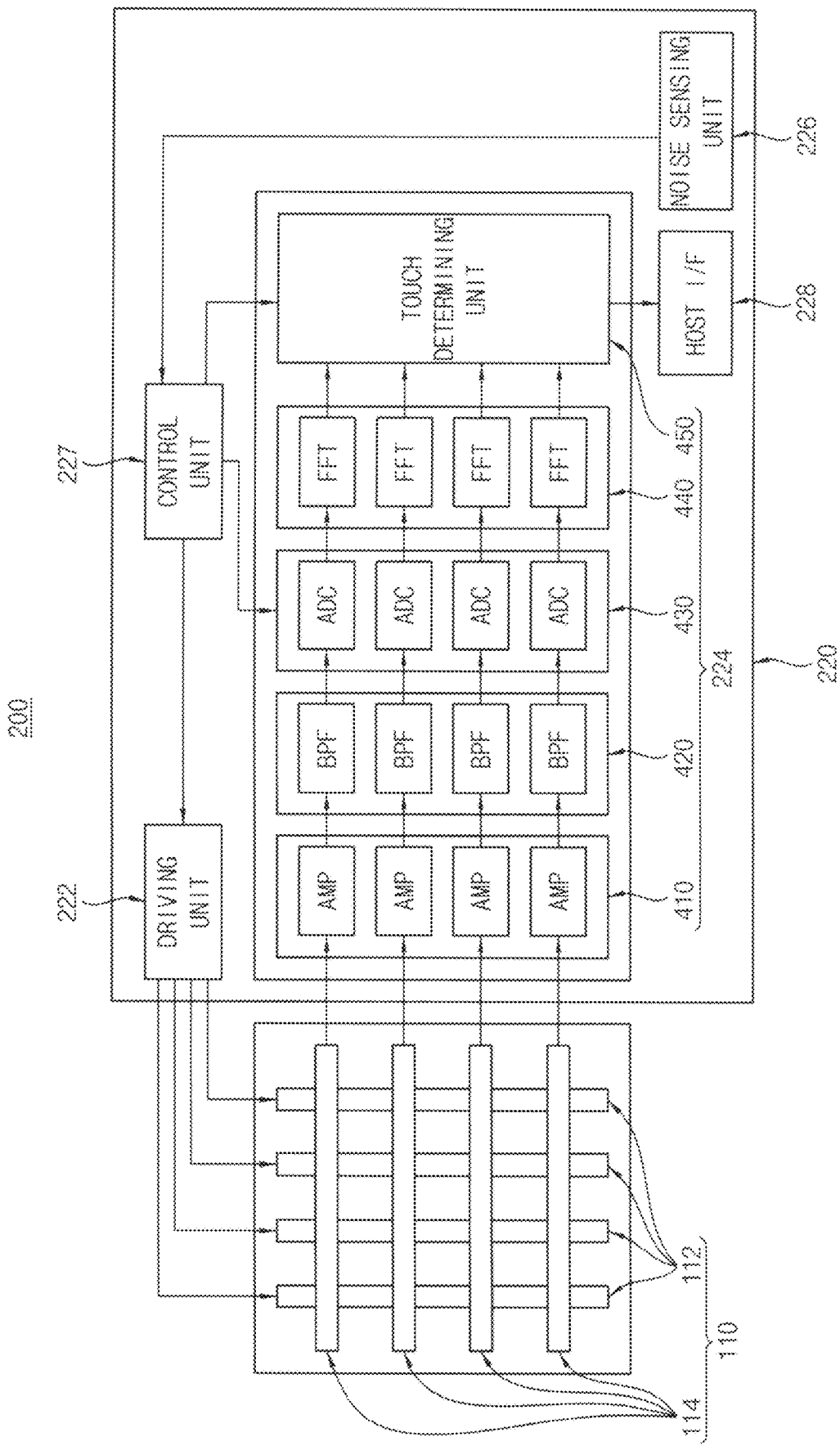
FIG. 4 is a block diagram illustrating a touch sensing device according to another exemplary embodiment of the present invention.

FIG. 4 is a block diagram illustrating a touch sensing device 200 according to another exemplary embodiment of the present invention.

Referring to FIG. 4, a touch sensing device 200 according to another exemplary embodiment of the present invention includes a touch panel 110 and a touch sensing controller 220.

The touch panel 110 is the same as the touch panel 110 described with reference to FIG. 1. The same or like elements shown in FIG. 4 have been labeled with the same reference numerals as used above to describe the touch panel 110 shown in FIG. 1, and any repetitive detailed description thereof will be omitted.

The touch sensing controller 220 includes a driving unit 222, a sensing unit 224, a noise sensing unit 226 and a control unit 227. The touch sensing controller 220 provides the driving electrodes 112 with plural driving signals having different driving frequencies. The touch sensing controller 220 performs Fast Fourier transform (FFT) on sensing signals sensed by each of the sensing electrodes 114 to determine whether or not a touch is generated based on a variation amount of the sensing frequency magnitude with respect to the driving frequency.

As shown in FIG. 2, the driving unit 222 simultaneously supplies driving signals having different driving frequencies to each of the driving electrodes 112. The driving signals having different driving frequencies may be generated under the control of the control unit 227.

The sensing unit 224 receives a sensing signal from each of the sensing electrodes 114 and obtains frequency magnitude of the sensing signal through a Fast Fourier transform. The sensing unit 324 determines whether or not a touch is generated based on a variation amount between frequency magnitude of the sensing signal and frequency magnitude of the driving signal.

The sensing unit 224 includes a signal amplifying unit 410, a bandpass filter unit 420, an analog-to-digital converting unit 430, a Fast Fourier transform unit 440, and a touch determining unit 450.

The signal amplifying unit 410 includes a plurality of signal amplifiers. The signal amplifying unit 410 is connected to each of the sensing electrodes 114. The signal amplifying unit 410 amplifies a sensing signal output from each of the sensing electrodes 114 to provide the amplified sensing signal to the bandpass filter unit 420.

The bandpass filter unit 420 includes a plurality of bandpass filters, band-pass filters each of the amplified sensing signals, and provides the band-pass filtered signals to the analog-to-digital converting unit 430.

The analog-to-digital converting unit 430 includes a plurality of analog-to-digital converters, converts each of the band-pass filtered sensing signals, and provides the converted signals to the Fast Fourier transform unit 440. The analog-to-digital converting unit 430 performs the ADC conversion at a frequency at least two times faster than the driving frequency. Information about the driving frequency may be provided from the control unit 227.

The Fast Fourier transform unit 440 includes a plurality of Fast Fourier transformers. The Fast Fourier transform unit 440 performs Fast Fourier transform each of the digital-converted sensing signals to convert each of the sensing signals from the time domain to the frequency domain to obtain the frequency component and a magnitude of the frequency component, and provides the touch determining unit 450 with the frequency component and the magnitude of the frequency component.

The touch determining unit 450 determines whether or not a touch is generated based on a variation amount between frequency magnitudes of the Fast Fourier transformed sensing signals based on the frequency magnitude of the driving signal. Information about the driving frequency may be provided from the control unit 227.

The noise sensing unit 226 senses surrounding noise components and provides the control unit 227 with frequency characteristics of the sensed noise components. The noise component may be a charger noise component generated in a mobile phone or a noise component generated by surrounding artificial light. As frequency characteristics of the noise components are provided from the noise sensing unit 226, the control unit 227 controls the driving unit 222 so that the driving unit 222 avoids the frequency band of the noise component to set the frequency of the driving signal. Moreover, the control unit 227 supplies information for the frequency of the driving signal to the analog-to-digital converting unit 430 so that the analog-to-digital converting unit 430 converts the driving signal at a frequency faster than the frequency of the driving signal.

When a control signal is provided from the control unit 227 by being provided with the frequency characteristic of the noise component to the control unit 227, the driving unit 222 determines the frequency of a driving signal by avoiding the frequency band of the noise components. That is, when a noise component flows during a touch sensing operation, the driving unit 222 sets a frequency of the driving signal by excluding the frequency band of the noise component.

The touch sensing controller 220 may further include a host interface 228. The host interface 228 provides a touch position determined by the touch determining unit 450 to an external host (not shown).

Generally, a touch sensing is sensitive to external noise, for example, power supply noise, LCD drive noise, R/F noise, three-wavelength noise, etc., so that sensing and operating the touch screen is performed through a filter algorithm or frequency hopping technique in order to remove noise.

However, in the present invention, since a touch is sensed through a variation amount of a transmission frequency magnitude already known in a sensed signal, it is easy to distinguish a noise component having a frequency component from a touch component. Therefore, it is possible to measure only the variation amount of the sensing signal of the desired frequency by using the result of the FFT without a separate process for the noise component generated in the operating environment of the touch screen, so that an adverse influence due to the noise may be solved more easily.

On the other hand, since the various noise components are present in a mobile phone employing the touch sensing device, an efficiency of a touch sensing may be reduced.

Figure 5:
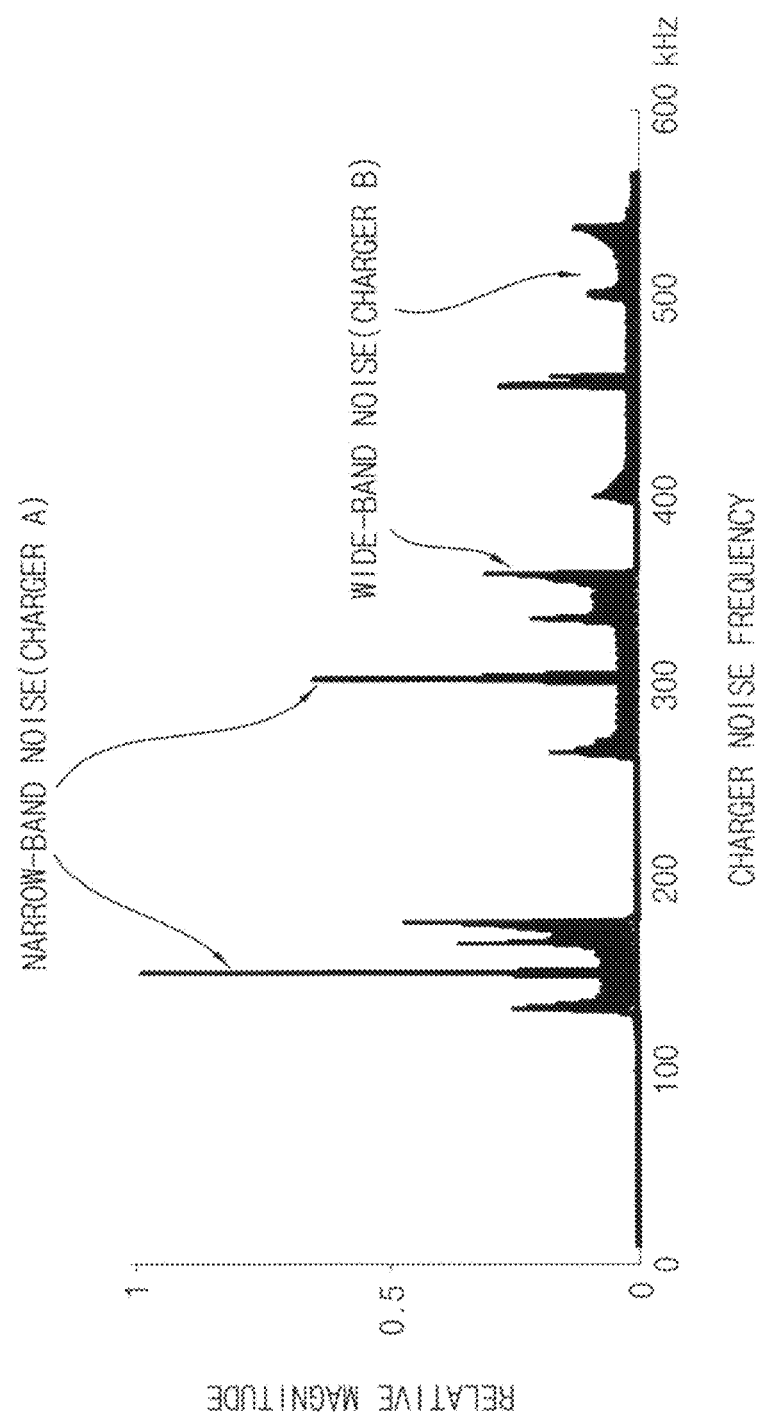
FIG. 5 is a frequency noise spectrum illustrating charger noise generated in a mobile phone employing the touch sensing device.

FIG. 5 is a frequency noise spectrum illustrating charger noise generated in a mobile phone employing the touch sensing device.

Referring to FIG. 5, the noise (i.e., charger noise) generated in a charger of the mobile phone includes narrow-band noise components generated at about 150 kHz, about 300 kHz and about 470 kHz and a wideband noise component generated at a band of 130 kHz to 180 kHz, a band of 260 kHz to 370 kHz and a band of 400 kHz to 560 kHz. When such a charger noise flows into a touch sensing device employed in a mobile phone, it is difficult to process the charger noise.

Figure 6:
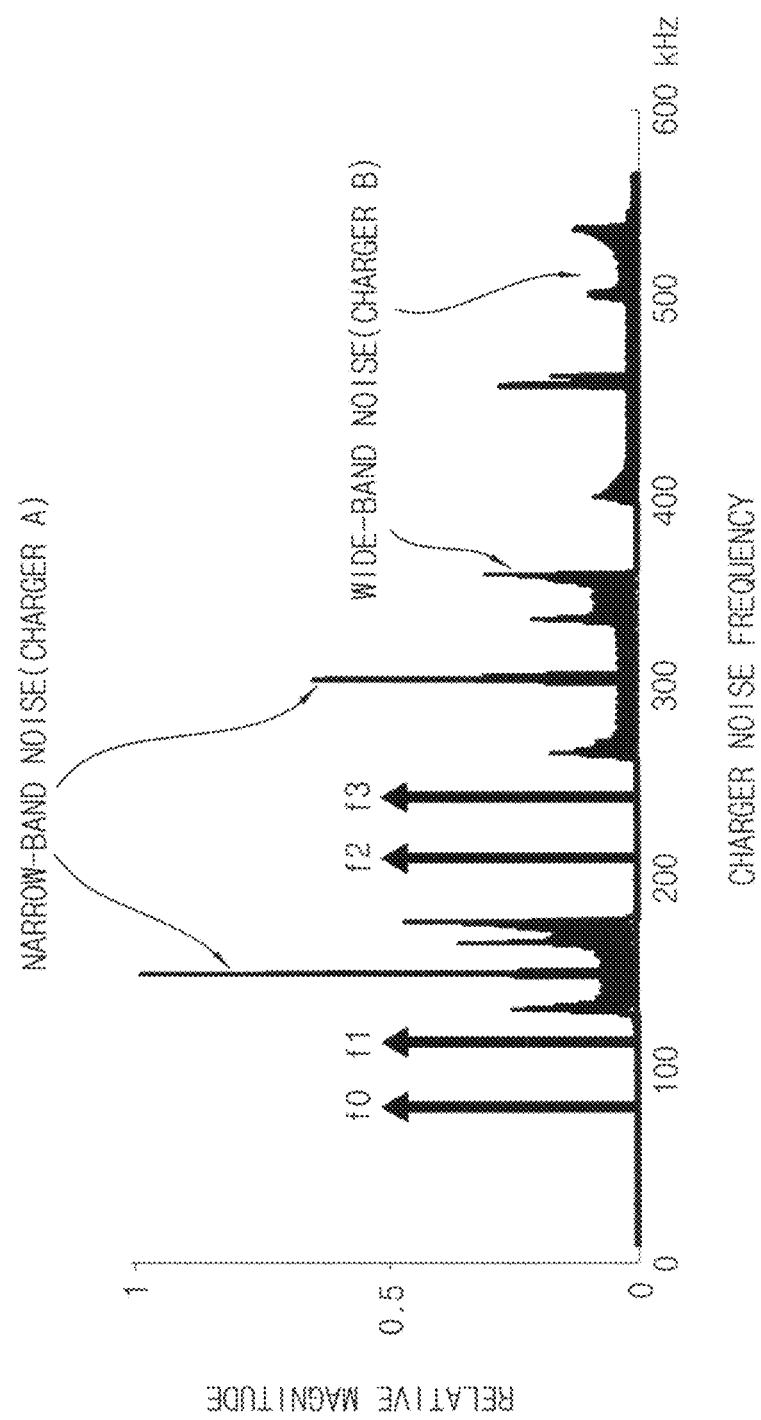
FIG. 6 is a frequency noise spectrum illustrating a driving frequency setting in the frequency noise spectrum of FIG. 5.

FIG. 6 is a frequency noise spectrum illustrating a driving frequency setting in the frequency noise spectrum of FIG. 5.

Referring to FIG. 6, it may drive a touch sensing device in a first driving frequency f0, a second driving frequency f1, a third drying frequency f2 and a fourth driving frequency f3 while avoiding the frequency of about 150 kHz, about 300 kHz, about 470 kHz, 130 kHz to 180 kHz, 260 kHz to 370 kHz, and 400 kHz to 560 kHz which is a noise-heavy frequency band in the noise spectrum. By measuring only the change rate of a corresponding frequency magnitude in the sensed signal, it is possible to sense by avoiding noise.

Figure 7:
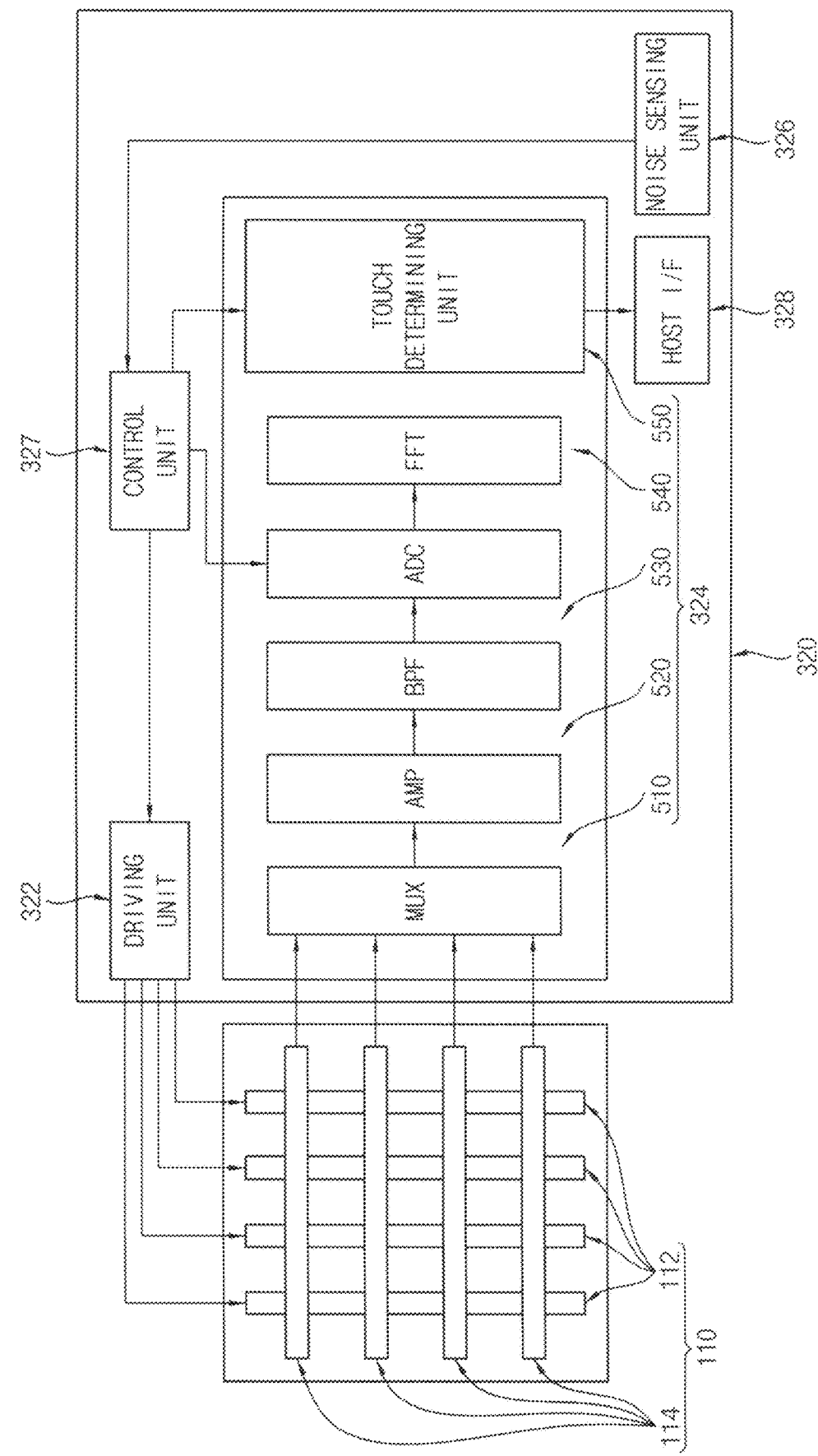
FIG. 7 is a block diagram illustrating a touch sensing device according to another exemplary embodiment of the present invention.

FIG. 7 is a block diagram illustrating a touch sensing device 300 according to another exemplary embodiment of the present invention.

Referring to FIG. 7, a touch sensing device 300 according to another embodiment of the present invention includes a touch panel 110 and a touch sensing controller 320.

The touch panel 110 is the same as the touch panel 110 described with reference to FIG. 1. The same or like elements shown in FIG. 7 have been labeled with the same reference numerals as used above to describe the touch panel 110 shown in FIG. 1, and any repetitive detailed description thereof will be omitted.

The touch sensing controller 320 includes a driving unit 322 sensing unit 324, a noise sensing unit 326 and a control unit 327. The touch sensing controller 320 provides the driving electrodes 112 with plural driving signals having different driving frequencies. The touch sensing controller 320 performs Fast Fourier transform (FFT) the sensing signals sensed by each of the sensing electrodes 114 to determine whether or not a touch is generated based on a variation amount of the sensing frequency magnitude with respect to the driving frequency.

As shown in FIG. 2, the driving unit 322 simultaneously supplies driving signals having different driving frequencies to each of the driving electrodes 112. The driving signals having different driving frequencies may be generated under the control of the control unit 327.

The sensing unit 324 receives a sensing signal from each of the sensing electrodes 114 and obtains frequency magnitude of the sensing signal through a Fast Fourier transform. The sensing unit 324 determines whether or not a touch is generated based on a variation amount between frequency magnitude of the sensing signal and frequency magnitude of the driving signal.

The sensing unit 324 includes a multiplexer 510, a signal amplifying unit 520, a bandpass filter unit 530, an analog-to-digital converting unit 540, a Fast Fourier transform unit 550 and a touch determining unit 560.

The multiplexer 510 is connected to each of the sensing electrodes 114 and selects one of the sensing signals output from each of the sensing electrodes 114 to provide the signal amplifying unit 520 with the selected sensing signal.

The signal amplifying unit 520 includes one signal amplifier and amplifies the sensing signal selected by the multiplexer 510 to provide the bandpass filter unit 530 with the amplified sensing signal.

The bandpass filter unit 530 includes a band-pass filter and band-pass filters each of the amplified sensing signals to provide the analog-to-digital converting unit 540 with the band-pass filtered signals.

The analog-to-digital converting unit 540 includes one analog-to-digital converter and converts each band-pass filtered sensing signal into a digital signal to provide the Fast Fourier transform unit 550 with the digital converted signal. The analog-to-digital converting unit 540 performs the ADC conversion at a frequency at least two times faster than the driving frequency. Information about the driving frequency may be provided from the control unit 327.

The Fast Fourier transform unit 550 includes one Fast Fourier transformer. The Fast Fourier transform unit 550 Fast-Fourier-transforms each of the digitally converted sensing signals to convert the sensing signal of the time domain to the sensing signal of the frequency domain, and obtain a frequency component and a magnitude of the frequency component to provide to the touch determining unit 560.

The touch determining unit 560 determines whether or not a touch is generated based on a variation amount between frequency magnitudes of the Fast Fourier transformed sensing signals based on the frequency magnitude of the driving signal. Information about the driving frequency may be provided from the control unit 327.

In the present embodiment, the sensing unit 324 includes the bandpass filter unit 530, but the bandpass filter unit 530 may be omitted. The bandpass filter unit 530 may be replaced with a low pass filter unit or a high pass filter unit.

The noise sensing unit 326 senses surrounding noise components and provides the control unit 327 with frequency characteristics of the sensed noise components. The noise component may be a charger noise component generated in a mobile phone or a noise component generated by surrounding artificial light. As frequency characteristics of the noise components are provided from the noise sensing unit 326, the control unit 327 controls the driving unit 322 so that the driving unit 322 avoids the frequency band of the noise component to set the frequency of the driving signal. Moreover, the control unit 327 supplies information for the frequency of the driving signal to the analog-to-digital converting unit 530 so that the analog-to-digital converting unit 530 converts the driving signal at a frequency faster than the frequency of the driving signal.

When a control signal is provided from the control unit 227 by being provided with the frequency characteristic of the noise component to the control unit 227, the driving unit 322 determines the frequency of a driving signal by avoiding the frequency band of the noise components. That is, when a noise component flows during a touch sensing operation, the driving unit 322 sets a frequency of the driving signal by excluding the frequency band of the noise component.

The touch sensing controller 320 may further include a host interface 328. The host interface 328 provides a touch position determined by the touch determining unit 550 to an external host (not shown).

Figure 8:
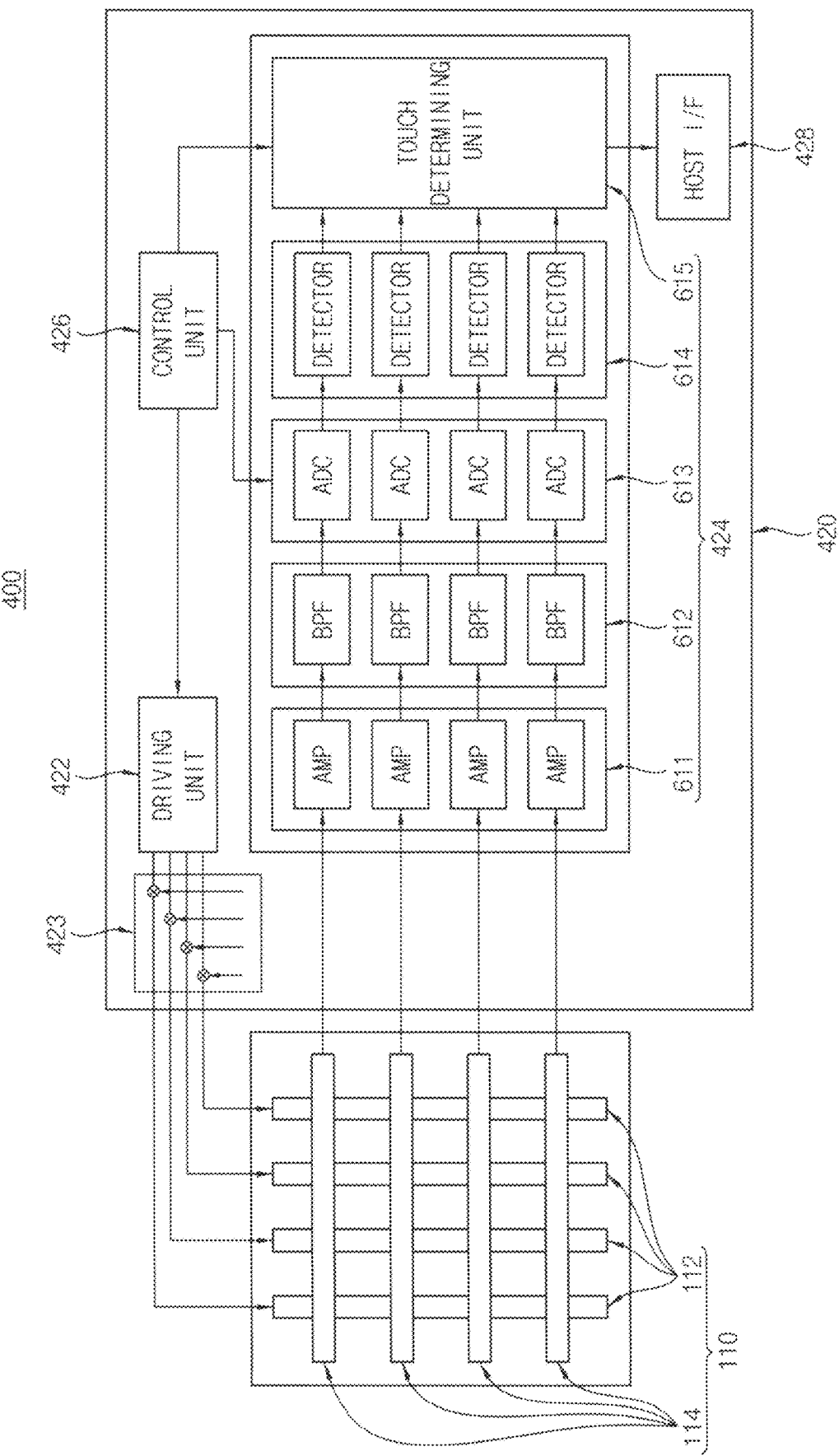
FIG. 8 is a block diagram illustrating a touch sensing device according to another exemplary embodiment of the present invention.

FIG. 8 is a block diagram illustrating a touch sensing device according to another exemplary embodiment of the present invention.

Referring to FIG. 8, the touch sensing device 400 according to another exemplary embodiment of the present invention includes a touch panel 110 and a touch sensing controller 420.

Since the touch panel 110 is the same as the touch panel 110 described with reference to FIG. 1, the same reference numerals are used, and detailed description thereof will be omitted.

The touch sensing controller 420 includes a driving unit 422, a convolution part 423, a sensing unit 424 and a control unit 426. The touch sensing controller 420 provides the driving electrodes 412 with plural driving signal having different driving frequencies. The touch sensing controller 420 performs fast Fourier transform (FFT) the sensing signals sensed by each of the sensing electrodes 114 to determine whether or not a touch is generated based on a variation amount of the sensing frequency magnitude with respect to the driving frequency. In the present exemplary embodiment, the touch sensing controller 420 performs a convolution operation on a mixing signal having a predetermined frequency and the driving signal, and processes the mixing signal from the convoluted sensing signal to determine whether or not a touch is generated by reconstructing the original driving signal.

The driving unit 422 provides driving signals having different driving frequencies to the convolution part 423.

The convolution part 423 simultaneously provides the driving electrodes 412 to each of the driving electrodes after convolution processing the mixing signal having a predetermined frequency to the driving signal.

The sensing unit 424 receives a sensing signal from each of the sensing electrodes 114 to obtain a frequency magnitude of a sensing signal through a fast Fourier transform, and determines whether or not a touch is generated based on a variation amount between the frequency magnitude of the sensing signal and the frequency magnitude of the driving signal.

The sensing unit 424 includes a signal amplifying part 611, a band pass filtering part 612, an analog-digital converting part 613, a signal detection part 614 and a touch determining unit 615.

The signal amplifying part 611 includes a plurality of signal amplifiers to be connected to each of the sensing electrodes 114. The signal amplifying part 611 amplifies a sensing signal output from each of the sensing electrodes 114 to provide the amplified sensing signal to the band pass filtering part 612.

The band pass filtering part 612 includes a plurality of band pass filters. The band pass filtering part 612 performs band pass filtering on each of the amplified sensing signals and provides them to the analog-to-digital converting part 613.

The analog-to-digital converting part 613 includes a plurality of analog-to-digital converters. The analog-to-digital converting part 613 digitally converts each of the band pass filtered sensing signals and provides the digital converted sensing signals to the signal detection part 614. The analog-digital converting part 613 performs analog-to-digital conversion at a frequency that is at least two times faster than the driving frequency. Information about the driving frequency may be provided from the control unit 426.

The signal detecting part 614 includes a plurality of fast Fourier transformers. The signal detecting part 614 performs fast Fourier transform (FFT) on each of the digitally converted sensing signals to provide the touch determining unit 615 with a frequency component and a magnitude of the frequency component. That is, the signal detecting part 614 converts each of the sensing signals from the time domain to a frequency domain, obtains the frequency component and the magnitude of the frequency component in the converted frequency domain, and then provides the frequency component and the magnitude of the frequency component to the touch determining unit 615. In the present exemplary embodiment, by converting the sensing in the time domain to the sensing in the frequency domain, it is very useful for digital signal processing.

The touch determining unit 615 determines whether or not a touch is generated based on a variation amount between frequency magnitudes of the fast Fourier transformed sensing signals based on the frequency magnitude of the driving signal. Information about the frequency of the driving signal may be provided from the control unit 426.

The touch sensing controller 420 may further include a host interface 426. The host interface 426 provides a touch position determined by the touch determining part 450 to an external host (not shown).

The touch sensing controller 420 may further include one or more memory devices (not shown) for storing measured sizes and associated parameters, and a microprocessor (not shown) for performing the necessary computation and control functions.

In order to perform one or more of the functions described herein, other portions of the touch sensing controller 420 and/or the touch sensing device 400 may be realized as one or more application-specific integrated circuits (ASICs), application-specific standard product (ASSP) or the like.

In the present exemplary embodiment, the touch sensing controller 420 may further include a noise sensing unit (not shown). The noise sensing unit senses surrounding noise components and provides the driving unit 422 with frequency characteristics of the sensed noise components. The noise component may be a charger noise component generated in a mobile phone or a noise component generated by surrounding artificial light.

When a control signal is provided from the control unit 426 by being provided with the frequency characteristic of the noise component to the control unit 426, the driving unit 422 determines the frequency of a driving signal by avoiding the frequency band of the noise components. That is, when a noise component flows during a touch sensing operation, the driving unit 422 sets a frequency of the driving signal by excluding the frequency band of the noise component.

In the present exemplary embodiment, a deconvolution method may be used to reconstruct the touch original signal by using a signal in which the frequency of the driving signal and the mixing frequency of the mixing signal are combined. Here, deconvolution is an operation for removing convolution. In other words, deconvolution reverses the effects of convolution to know the input signal or system impulse response in the output signal resulting from the convolution between the input signal and the system impulse response.

Figure 9:
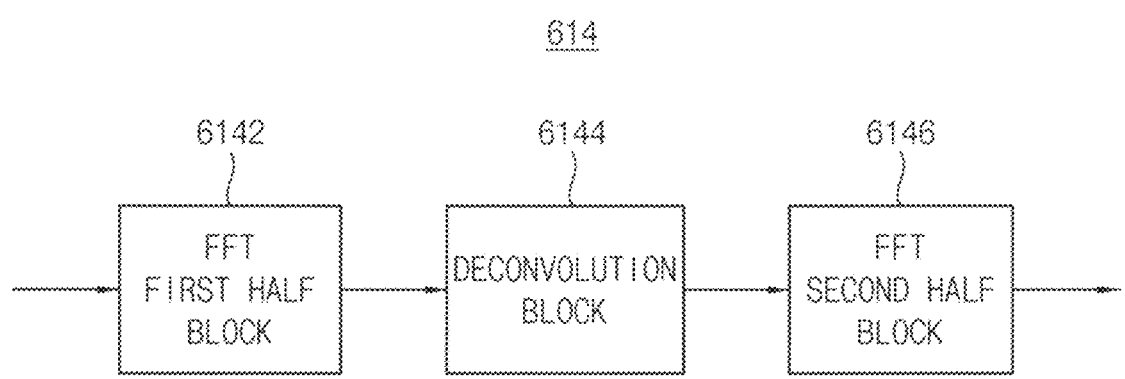
FIG. 9 is a block diagram schematically illustrating an exemplary embodiment of the signal detecting part shown in FIG. 8.
Figure 10:
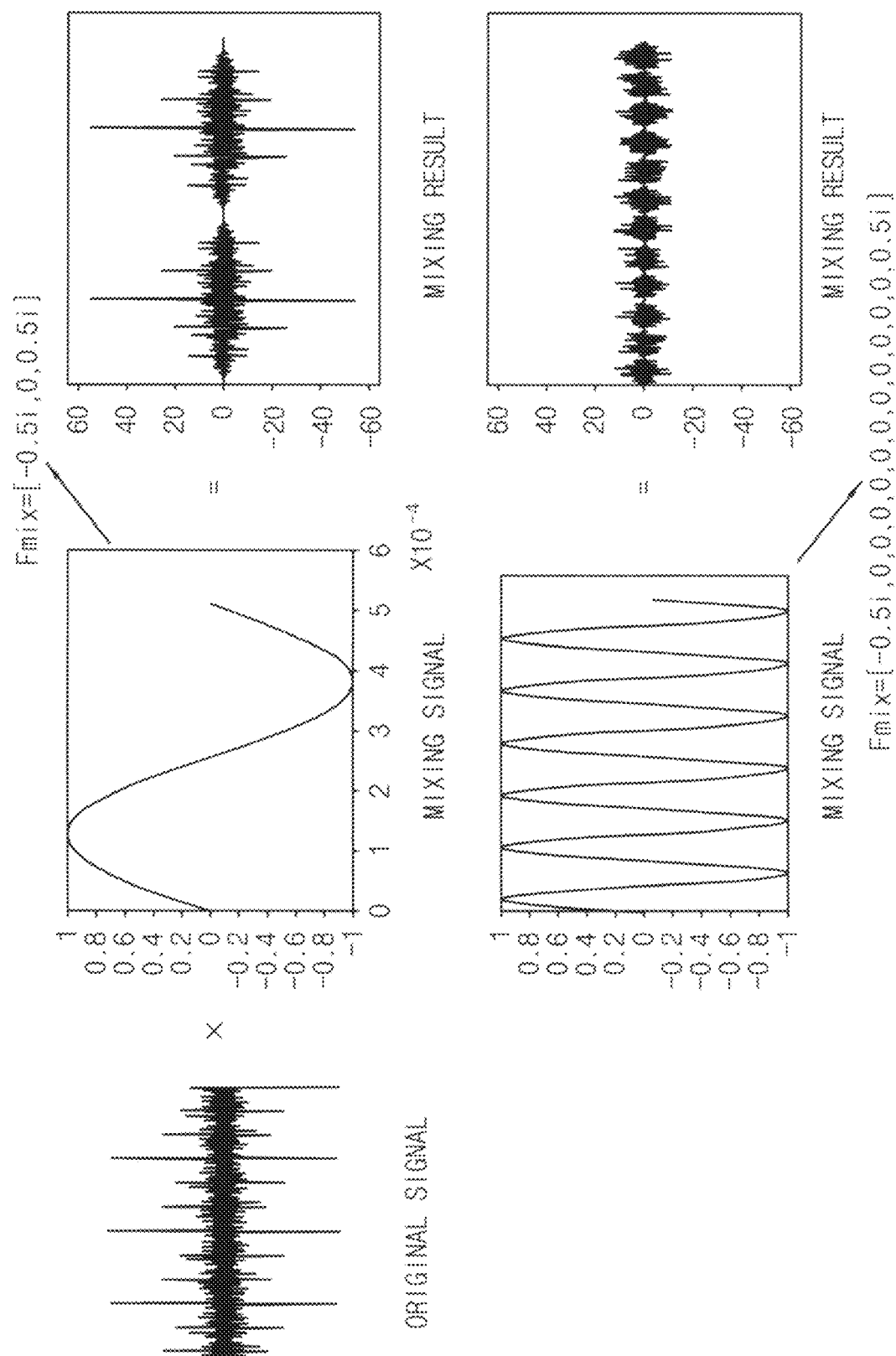
FIG. 10 is a waveform diagram schematically illustrating a signal detection method according to the signal detecting part described with reference to FIG. 9.
Figure 11:
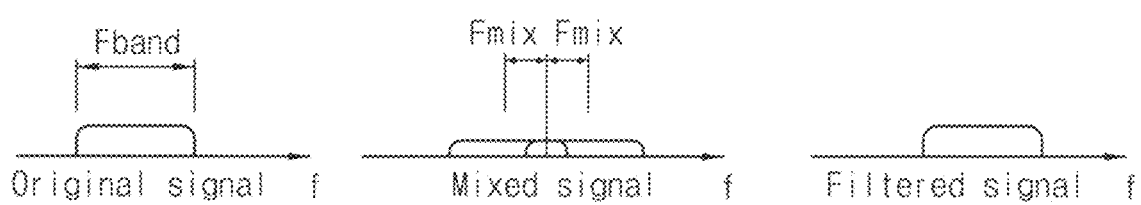
FIG. 11 is a conceptual diagram schematically illustrating reconstruction of a touch original signal by the signal detecting part described with reference to FIG. 10.

FIG. 9 is a block diagram schematically illustrating an exemplary embodiment of the signal detecting part 614 shown in FIG. 8. FIG. 10 is a waveform diagram schematically illustrating a signal detection method according to the signal detecting part 614 described with reference to FIG. 9. FIG. 11 is a conceptual diagram schematically illustrating reconstruction of a touch original signal by the signal detecting part 614 described with reference to FIG. 10. In particular, diagrams illustrating an example of reconstructing a touch original signal from an FFT result by applying a deconvolution filter.

Referring to FIG. 9 and FIG. 10, the signal detecting part 614 according to an exemplary embodiment includes an FFT first half block 6162, a deconvolution block 6144 and an FFT second half block 6146.

The FFT first half block 6162 performs a partial FFT processing for converting the digitally converted mixed sensing signal into the frequency domain, and provides the deconvolution block 6144 with the signal converted into in the frequency domain.

The deconvolution block 6144 performs a deconvolution operation on the FFT-processed mixed sensing signal, and provides the deconvoluted sensing signal to the FFT second half block 6146.

Specifically, in order to detect a signal according to the present exemplary embodiment, a signal passing through the ADC 440 in the readout IC disposed in an analog front end (AFE) IC is subjected to deconvolution in a discrete frequency domain. The equation for this is shown in Equation 1 below.

$$S'_{mix}[n] = \sum_{m=-\infty}^{\infty} F_{mix}[m] \cdot S[n-m]$$ [Equation 1]

If the length of the Fmix, S is 3, 5, respectively, the result of the Smix signal is as follows.

$$S'(0) = F_{mix}(0) \cdot S(0)$$
$$S'(1) = F_{mix}(1) \cdot S(0) + F_{mix}(0) \cdot S(1)$$
$$S'(2) = F_{mix}(2) \cdot S(0) + F_{mix}(1) \cdot S(1) + F_{mix}(0) \cdot S(2)$$
$$S'(3) = F_{mix}(2) \cdot S(1) + F_{mix}(1) \cdot S(2) + F_{mix}(0) \cdot S(3)$$
$$S'(4) = F_{mix}(2) \cdot S(2) + F_{mix}(1) \cdot S(3) + F_{mix}(0) \cdot S(4)$$
$$S'(5) = F_{mix}(2) \cdot S(3) + F_{mix}(1) \cdot S(4)$$
$$S'(6) = F_{mix}(2) \cdot S(4)$$

In this case, the mixing result according to fmix is changed as shown in FIG. 11.

On the other hand, when the deconvolution of the above signal, it is performed using the following pseudo code.

```
for i from 0 to length(S)-1
    S(i) = S _mix(i)/Fmix(0)
    S_mix(i : i+length(Fmix)-1) = S _mix(i : i+length(Fmix)-1) -
    S(i)Fmix(0 : length(Fmix)-1)
end
```

In order to reduce the computational load, it is preferable that the length of fmix is short. When the sample time for FFT processing and the period of the mixing frequency of the mixing signal are the same, the shortest fmix may be used.

The FFT second half block 526 obtains the frequency magnitude of each driving signal through a second half process of the FFT for the real component and the imaginary component of the recovered frequency.

Figure 12:
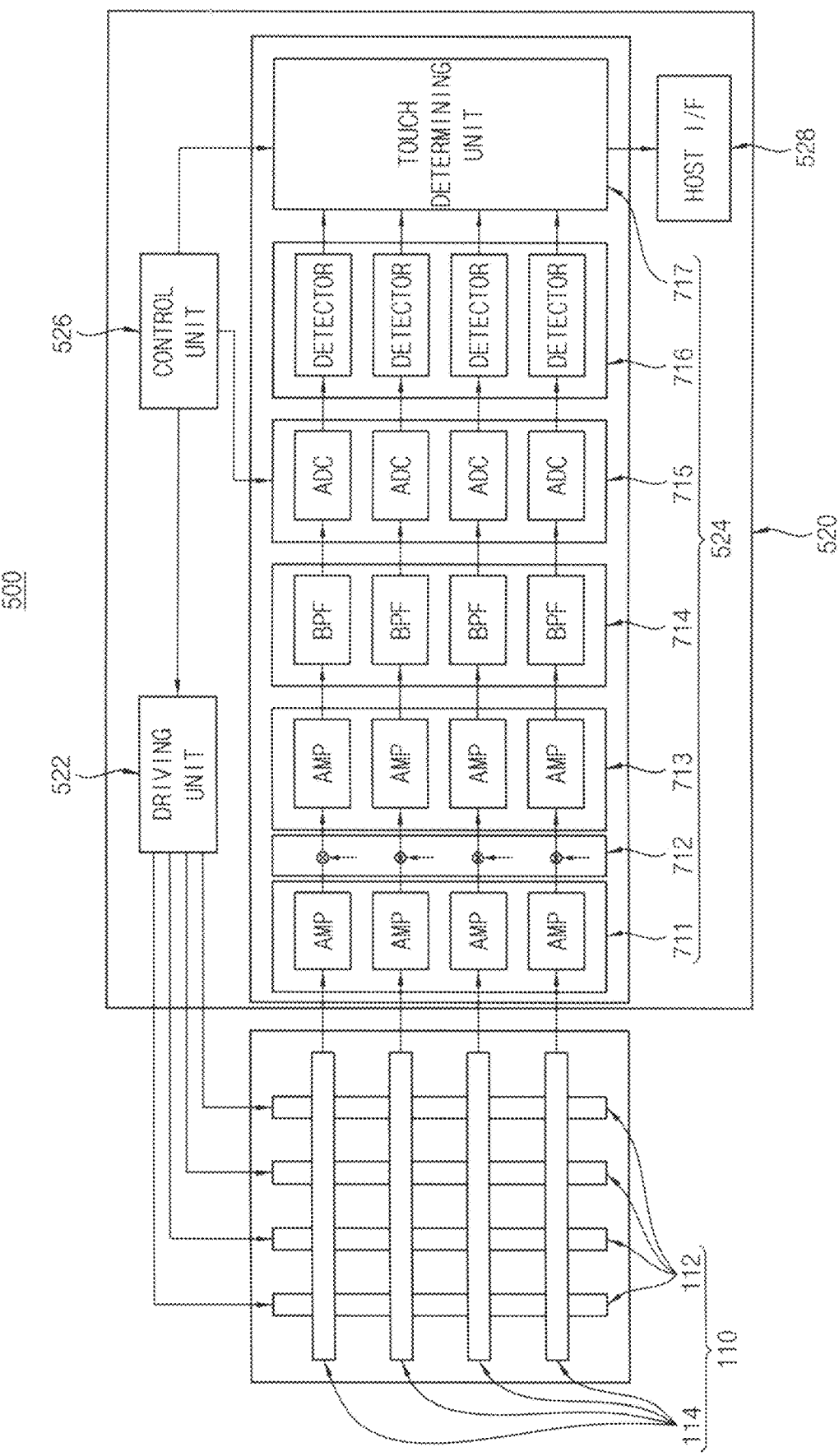
FIG. 12 is a block diagram illustrating a touch sensing device according to another exemplary embodiment of the present invention.

FIG. 12 is a block diagram illustrating a touch sensing device according to another exemplary embodiment of the present invention.

Referring to FIG. 12, the touch sensing device 500 according to another exemplary embodiment of the present invention includes a touch panel 110 and a touch sensing controller 520.

Since the touch panel 110 is the same as the touch panel 510 described in FIG. 1, the same reference numerals are used, and detailed description thereof will be omitted.

The touch sensing controller 520 includes a driving unit 522, a sensing unit 524, and a control unit 526. The touch sensing controller 520 provides the driving electrodes 112 with plural driving signal having different driving frequencies. The touch sensing controller 520 performs fast Fourier transform (FFT) the sensing signals sensed by each of the sensing electrodes 114 to determine whether or not a touch is generated based on a variation amount of the sensing frequency magnitude with respect to the driving frequency. In the present exemplary embodiment, the touch sensing controller 520 performs a convolution operation on a mixing signal having a predetermined frequency and the sensing signal, separates the mixing signal from the convolved sensing signal, and then determines whether or not a touch is generated by reconstructing the original driving signal.

The driving unit 522 simultaneously supplies driving signals having different driving frequencies to each of the driving electrodes 112.

The sensing unit 524 performs a convolution operation on the mixing signal and a sensing signal received through each of the sensing electrodes 114. The sensing unit 524 separates the mixing signal from the convoluted sensing signal, and reconstructs the original driving signal to determine whether or not a touch is generated.

The sensing unit 524 includes a first signal amplifying part 711, a convolution part 712, a second signal amplifying part 713, a band pass filtering part 714, an analog-digital converting part 715, a signal detecting part 716 and a touch determining unit 717.

The first signal amplifying part 711 amplifies a sensing signal sensed through a plurality of sensing electrodes, and then provides the amplified sensing signal to the convolution part 712.

The convolution part 712 performs a convolution operation between a mixing signal having a predetermined frequency and each of the amplified sensing signals, and then provides the convoluted sensing signal to the second signal amplifying unit 713.

The second signal amplifying part 713 amplifies the convolution processed sensing signal and then provides the amplified sensing signal to the band pass filtering part 714.

The band pass filter unit 714 performs band pass filtering on the amplified sensing signal and then provides the band pass filtered sensing signal to the analog-digital converting part 715.

The analog-to-digital converter 715 digitally converts the band pass filtered sensing signal and then provides the digitally converted sensing signal to the signal detecting part 716.

Since the signal detecting part 716 is the same as the signal detecting part 716 described with reference to FIG. 9 and FIG. 10, a detailed description thereof will be omitted.

The touch determining unit 717 determines whether or not a touch is generated based on a variation amount between the obtained frequency magnitude and a frequency magnitude of the driving signal. Information about the frequency of the driving signal may be provided from the control unit 526.

In the present exemplary embodiment, the touch sensing controller 520 may further include a host interface 528. The host interface 528 provides a touch position determined by the touch determining unit 717 to an external host (not shown).

In the present exemplary embodiment, the touch sensing controller 520 may further include a noise sensing unit (not shown). The noise sensing unit senses surrounding noise component and provides the driving unit 522 with frequency characteristics of the sensed noise component. The noise component may be a charger noise component generated in a mobile phone or a noise component generated by surrounding artificial light.

When a control signal is provided from the control unit by being provided with the frequency characteristic of the noise component to the control unit, the driving unit 522 determines the frequency of a driving signal by avoiding the frequency band of the noise components. That is, when a noise component flows during a touch sensing operation, the driving unit 522 sets a frequency of the driving signal by excluding the frequency band of the noise component.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A touch sensing method comprising:
providing each of a plurality of driving electrodes with a driving signal obtained by performing a convolution operation of mixing each of a plurality of driving signals having different frequencies and a mixing signal having a predetermined frequency;
amplifying a sensing signal sensed through a plurality of sensing electrodes;
band pass filtering the amplified sensing signal;
performing an analog-to-digital conversion of the band pass filtered sensing signal;
obtaining a real component and an imaginary component for each frequency of the sensed signal through first half processing of a Fast Fourier Transform (FFT) on the analog-digital converted sensing signal;
performing a deconvolution operation on the real component and the imaginary component to reconstruct a frequency of the plurality of driving signals having different frequencies;
obtaining a frequency magnitude of each driving signal through second half processing of the FFT for a real component and an imaginary component of a recovered frequency; and
determining whether or not a touch is generated based on a variation amount between the obtained frequency magnitude and a frequency magnitude of the driving signal.

2. The touch sensing method of claim 1, wherein the mixing signal comprises a sinusoidal wave, and a frequency of the sinusoidal wave is 0.5 times a minimum frequency interval of the plurality of driving signals to an integer multiple of the minimum frequency interval.

3. The touch sensing method of claim 1, wherein the frequency of the plurality of driving signals having different frequencies is determined to avoid a frequency band of a noise component.

4. The touch sensing method of claim 1, wherein when a noise component is introduced during a touch sensing operation, a frequency of the plurality of driving signals having different frequencies is set except for the frequency band of the noise component.

5. The touch sensing method of claim 1, wherein the amplified signal is analog-digital converted to a frequency two times faster than a frequency of the plurality of driving signals having different frequencies.

6. A touch sensing method comprising:
providing each of a plurality of driving electrodes with a plurality of driving signals having different frequencies;
first amplifying a sensing signal sensed through a plurality of sensing electrodes;
performing a convolution operation of mixing each of the first amplified sensing signals and a mixing signal having a predetermined frequency;
second amplifying the sensing signal on which the convolution operation is performed;
band pass filtering the second amplified sensing signal;
performing an analog-to-digital conversion of the band pass filtered sensing signal;
obtaining a real component and an imaginary component for each frequency of the sensed signal through a first half processing of a Fast Fourier Transform (FFT) on the analog-digital converted sensing signal;
performing a deconvolution operation on the real component and the imaginary component to reconstruct a frequency of the plurality of driving signals having different frequencies;
obtaining a frequency magnitude of each driving signal through a second half processing of the FFT for a real component and an imaginary component of a recovered frequency; and
determining whether or not a touch is generated based on a variation amount between the obtained frequency magnitude and a frequency magnitude of the driving signal.

7. The touch sensing method of claim 6, wherein the mixing signal comprises a sinusoidal wave, and a frequency of the sinusoidal wave is 0.5 times a minimum frequency interval of the plurality of driving signals to an integer multiple of the minimum frequency interval.

8. The touch sensing method of claim 6, wherein the frequency of the plurality of driving signals having different frequencies is determined to avoid a frequency band of a noise component.

9. The touch sensing method of claim 6, wherein when a noise component is introduced during a touch sensing operation, a frequency of the plurality of driving signals having different frequencies is set except for the frequency band of the noise component.

10. A touch sensing device comprising:
a touch panel in which a plurality of driving electrodes and a plurality of sensing electrodes are disposed; and
a touch sensing controller providing a plurality of driving electrodes with a plurality of driving signals having different frequencies from each other, respectively, and performing a Fast Fourier Transform (FFT) processing on sensing signals sensed at each of the sensing electrodes to determine whether or not a touch is generated based on a variation amount between frequency magnitude of the sensing signals and frequency magnitude of the plurality of driving signals,
wherein the touch sensing controller performs a convolution operation of mixing the plurality of driving signals or the sensing signals and a mixing signal having a predetermined frequency, and separates the mixing signal from the sensing signals with the convolution operation to determine whether or not a touch is generated by reconstructing an original driving signal,
wherein the touch sensing controller comprises:
a driving unit configured to output a driving signal obtained by performing a convolution operation for mixing the mixing signal to the plurality of driving signals to the plurality of driving electrodes; and
a sensing unit configured to separate the mixing signal from the convoluted sensing signal received through the sensing electrode and determines whether a touch occurs by reconstructing the original driving signal,
wherein the sensing unit comprises:
a signal amplifying part configured to amplify a sensing signal sensed through a plurality of sensing electrodes;
a band pass filtering part configured to band pass filter the amplified sensing signal;
an analog-digital converting part configured to digitally convert the band pass filtered sensing signal;
a Fast Fourier Transform (FFT) first half block configured to obtain a real component and an imaginary component for each frequency of the sensed signal through first half processing of FFT for the digitally converted sensing signal;
a deconvolution block configured to perform a deconvolution operation on the real component and the imaginary component to reconstruct a frequency of an original driving signal;
a FFT second half block configured to obtain a frequency magnitude of each driving signal through the latter processing of the FFT for the real component and the imaginary component of the recovered frequency; and
a touch determining unit configured to determine whether or not a touch is generated based on a variation amount between the obtained frequency magnitude and the frequency magnitude of the plurality of driving signals.

11. The touch sensing device of claim 10, wherein the touch sensing controller further comprises a control unit providing the analog-to-digital converting part with information about the frequency of the plurality of driving signals so that the analog-to-digital converting part converts the driving signal at a frequency faster than the frequency of the driving signal.

12. The touch sensing device of claim 11, wherein the touch sensing controller further comprises a noise sensing unit sensing a surrounding noise component and providing the control unit with a frequency characteristic of the sensed noise component.

13. The touch sensing device of claim 12, wherein the control unit controls the driving unit so that the frequency band of the noise component provided by the noise sensing unit is avoided to generate the plurality of driving signals.

14. A touch sensing device comprising:
a touch panel in which a plurality of driving electrodes and a plurality of sensing electrodes are disposed; and
a touch sensing controller providing a plurality of driving electrodes with a plurality of driving signals having different frequencies from each other, respectively, and performing a Fast Fourier Transform (FFT) processing on sensing signals sensed at each of the sensing electrodes to determine whether or not a touch is generated based on a variation amount between frequency magnitude of the sensing signals and frequency magnitude of the plurality of driving signals, wherein the touch sensing controller performs a convolution operation of mixing the plurality of driving signals or the sensing signals and a mixing signal having a predetermined frequency, and separates the mixing signal from the sensing signals with the convolution operation to determine whether or not a touch is generated by reconstructing an original driving signal, wherein the touch sensing controller comprises:

a driving unit configured to provide a driving signal to a driving electrode; and a sensing unit configured to convolute a mixing signal having a predetermined frequency to the plurality of driving signals or the sensing signals, and separate the mixing signal from the convoluted sensing signal to determine whether or not a touch is generated by reconstructing an original driving signal, wherein the sensing unit comprises:

a signal amplifying part configured to first amplify a sensing signal sensed through plural sensing electrodes, convoluting a mixing signal having a predetermined frequency to each of the first amplified sensing signal, and second amplify the convoluted sensing signal;

a band pass filtering part configured to band pass filter the second amplified sensing signal;

an analog-digital converting part configured to digitally convert the band pass filtered sensing signal;

a FFT (Fast Fourier Transform) first half block configured to obtain a real component and an imaginary component for each frequency of the sensed signal through first half processing of FFT for the digitally converted sensing signal;

a deconvolution block configured to perform a deconvolution operation on the real component and the imaginary component to reconstruct a frequency of an original driving signal;

a FFT second half block configured to obtain a frequency magnitude of each driving signal through the latter processing of the FFT for the real component and the imaginary component of the recovered frequency; and a touch determining unit configured to determine whether or not a touch is generated based on a variation amount between the obtained frequency magnitude and the frequency magnitude of the plurality of driving signals.

15. The touch sensing device of claim 14, wherein the touch sensing controller further comprises a control unit providing the analog-to-digital converting part with information about the frequency of the plurality of driving signals so that the analog-to-digital converting part converts the driving signal at a frequency faster than the frequency of the driving signal.

16. The touch sensing device of claim 15, wherein the touch sensing controller further comprises a noise sensing unit sensing a surrounding noise component and providing the control unit with a frequency characteristic of the sensed noise component.

17. The touch sensing device of claim 16, wherein the control unit controls the driving unit so that the frequency band of the noise component provided by the noise sensing unit is avoided to generate the plurality of driving signals.

* * * * *